United States Patent [19]
Koksbang

[11] Patent Number: 5,340,671
[45] Date of Patent: Aug. 23, 1994

[54] VANADIUM OXIDE CATHODE ACTIVE MATERIAL AND METHOD OF MAKING SAME

[75] Inventor: Rene Koksbang, San Jose, Calif.

[73] Assignee: Valence Technology, Inc., San Jose, Calif.

[21] Appl. No.: 77,987

[22] Filed: Jun. 14, 1993

[51] Int. Cl.⁵ ............................................. H01H 4/02
[52] U.S. Cl. .................................. 429/218; 424/223; 424/224; 424/229
[58] Field of Search ............... 429/218, 223, 224, 229

[56] References Cited

U.S. PATENT DOCUMENTS 4,830,939 5/1989 Lee et al. ............................ 429/192

FOREIGN PATENT DOCUMENTS 0172868 10/1983 Japan.
0178958 10/1983 Japan.
0181268 10/1983 Japan.

OTHER PUBLICATIONS

J. Inorganic Nuclear Chem., 1969, vol. 31, pp. 3049–3058 (month unknown).
Translation of J. Inorg. Nucl. Chem., 1969, vol. 31, pp. 3049–3058.
Chem. Abstracts vol. 71, 1969, p. 347 (#105953g) (month unknown).
Bul. De La Soc. Chem. De France, 1967, No. 1, pp. 261–268.
Translation of Bul. De Le Soc. Chem. De France 1967 No. 1 pp. 261–268.
Chem. Abstracts vol. 66, 1967, p. 9485 (#101260c).

*Primary Examiner*—Stephen Kalafut
*Assistant Examiner*—M. Nuzzolillo
*Attorney, Agent, or Firm*—Linda Deschere

[57] ABSTRACT

The present invention provides a lithium battery comprising a cathode active material comprising an oxide of vanadium, which is a compound of the general formula $M_{(1+y)}(V_3O_8)_2$. M is a divalent ion having a +2 valency and y is equal to or greater than zero and preferably is less than 2. The vanadium oxide active material of the invention is prepared by a series of steps in which solid precursor compounds are successively finely divided and heat treated.

22 Claims, 4 Drawing Sheets

VANADIUM OXIDE CATHODE ACTIVE MATERIAL AND METHOD OF MAKING SAME

FIELD OF THE INVENTION

This invention relates to electrochemical batteries, and more particularly to improved positive electrode active material mainly composed of an oxide of vanadium.

BACKGROUND OF THE INVENTION

Lithium-based cells or batteries often comprise cathodes of transition metal oxides which are used as intercalation compounds. The intercalation reaction involves the interstitial introduction of a guest species, namely, lithium into the host lattice of the transition metal oxide, essentially without structural modification of the host lattice. Such intercalation reaction is essentially reversible because suitable transition states are achieved for both the forward and reverse of the intercalation reaction.

However, transition metal oxides when used as active cathode materials in rechargeable lithium batteries, show a declining capacity during cyclic operation of the battery. This may be attributable to volume changes of the host material which takes place when lithium is inserted and extracted. Because of the rigidity of the structural network into which lithium is inserted, such insertion can lead to large perturbations of the structure involving partial or complete breakage of certain bonds which can irreversibly destroy the oxide structure, resulting in poor electrical performance for the cathode. Such structural breakdown can occur whether the structure has two dimensional characteristics of a layered structure, or a more rigid three dimensional network oxide lattice.

Therefore, what is needed is a new cathode active material based on vanadium oxide in a form which maintains its capacity and has good charge/discharge cyclic characteristics over its useful operating life. What is also needed is a method to form such vanadium oxide based materials.

SUMMARY OF THE INVENTION

The present invention provides a lithium battery comprising a cathode active material having as its major component an oxide of vanadium, which is a compound of the general formula $M_{(1+y)}(V_3O_8)_2$ where y has a value equal to or greater than zero. Desirably, y has a value in a range $0 \leq y \leq 2$, most desirably $0 \leq y \leq 1$, and preferably $0.5 \leq y \leq 1$. M is a metal or semi-metal having a valency of +2, M(II). Desirably, M is an alkaline earth metal or a transition metal having a valency of +2. Preferably, M is selected from the group consisting of magnesium, zinc, cobalt and nickel.

The vanadium oxide based active material $M_{(1+y)}(V_3O_8)_2$ is prepared for use in cells with an anode active material containing lithium or a compound which includes lithium. The cells also include an electrolyte which is electrochemically stable with respect to the cathode active material and lithium, and which allows lithium ions from the anode (negative electrode) to move therethrough to react electrochemically with the cathode active material of the invention.

A preferred lithium cell comprises the positive electrode active material of the invention, a negative electrode which is metallic lithium, and an electrolyte which is a solid electrolyte or electrolyte separator in the form of a polymeric network containing an electrolyte solution comprising a metal salt of lithium.

Accordingly, it is an object of the invention to provide a new cathode (positive electrode) vanadium oxide based active material for a lithium battery. Another object is to provide a method of making the new cathode material and the battery containing such cathode material. It is also an object of the invention to provide a lithium battery having a cathode active material containing a vanadium oxide based active material of the general formula $M_{(1+y)}(V_3O_8)_2$, where M is selected to provide structural stability for maintaining structural integrity of the oxide based material during charge and discharge. Another object is to provide a lithium battery having good charge and discharge capacity over its useful operating life.

These and other objects, features and advantages will become apparent from the following description of the preferred embodiments, appended claims and accompanying drawings.

DETAILED DESCRIPTION OF THE PREFERRED EMBODIMENTS

Figure 1:
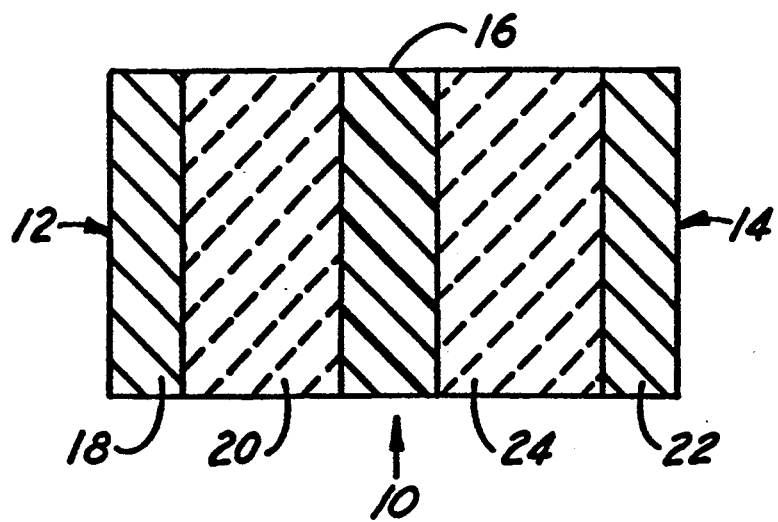
FIG. 1 is an illustration of a cross-section of a thin battery or cell embodying the invention.

As shown in FIG. 1, an electrochemical cell or battery 10 has a negative electrode side 12, a positive electrode side 14, and a separator 16 therebetween. In accordance with common usage, a battery may consist of one cell or multiple cells. The negative electrode is the anode during discharge, and the positive electrode is the cathode during discharge. The negative electrode side includes current collector 18, typically of nickel, iron, stainless steel, and/or copper foil, and a body of negative electrode active material 20 containing lithium or a compound which includes lithium. The negative electrode active material 20 is sometimes simply referred to as the negative electrode. The positive electrode side includes current collector 22, typically of aluminum, nickel, iron, stainless steel, and/or copper foil, or such foils having a protective conducting coating foil, and a body of positive electrode active material 24 which has as its main component one or more oxides of vanadium. The positive electrode active material 24 is sometimes simply referred to as the positive electrode. The separator 16 is typically a solid electrolyte, electrolyte separator. A suitable electrolyte separator (polymer electrolyte) is described in U.S. Pat. No. 4,830,939 incorporated herein by reference in its entirety. The electrolyte separator is a solid organic polymer matrix containing an ionically conducting liquid with an alkali metal salt and the liquid is an aprotic polar solvent. The terms "solid electrolyte" and "electrolyte separator" are used interchangeably in industry. Sometimes, the term "separator" is used.

The composition of the positive electrode active material 24 has a significant influence on the performance of battery 10. This is because when transition metal oxides are used as cathode active materials in such batteries, a declining capacity occurs during cyclic operation of the battery. This is thought to be due to the volume changes of the material which take place when lithium is inserted and extracted from the transition metal intercalation material.

In the case of $LiV_3O_8$, it is thought that the $V_3O_8^-$ layers are held together by $Li+$ ions. This produces rather weak bonding which is very likely to be responsible for structural instability of the material which manifests itself as a decline in capacity. It is thought that charge retention during cyclic operation can be improved by increasing the strength of the bonds which hold the $V_3O_8^-$ layers together and, therefore, maintain structural integrity of the vanadium oxide based ($V_3O_8^-$) cathode active material.

Accordingly in one embodiment, a cathode active material of the general nominal formula $M_{(1+y)}(V_3O_8)_2$ (vanadium oxide compound) is prepared from solid precursor materials containing metals and/or semi-metals in a series of reactions. The starting materials are ground and homogenized in a reaction mixture and subjected to several successive thermal treatments and grindings. In the general formula $M_{(1+y)}(V_3O_8)_2$, y has a value equal to or greater than zero. Desirably, y has a value in a range of $0 \leq y \leq 2$, most desirably $0 \leq y \leq 1$, and preferably $0.5 \leq y \leq 1$. M is a metal or semi-metal having a valency of $+2$.

Formation of $M^{II}_{(1+y)}(V_3O_8)_2$ Active Material

Materials of the formula $M^{II}_{(1+y)}(V_3O_8)_2$ are prepared by heat treatment of mixtures of corresponding oxides or by action of M (M=metal or semi-metal) on $V_2O_5$ at 600° C. to 800° C., to produce the desired complex oxide phase. A complex oxide is one which has more than one kind of atom (element) in addition to oxygen. Complex oxides of the invention have vanadium, oxygen and one other element selected from the group of metal and semi-metal elements having a valency of plus two ($+2$). The formation of such complex oxides of the formula $M_{(1+y)}(V_3O_8)_2$ may require several hours. Desirably, M is an alkaline earth metal or a transition metal with a $+2$ valency. Preferably, M is one or more of zinc, magnesium, cobalt and nickel. Specific methods for formation of such oxides are set forth below, along with a description of the physical properties, and compositional limits as illustrated in phase diagrams. Such methods, limits and diagrams are according to J. Galy as described in "No. 51.—Sur quelques Bronzes oxygenes de Vanadium a Element d'insertion divalent. Les sytemes $V_2O_5$—$VO_2$—MgO et $V_2O_5$—$VO_2$—ZnO", Bulletin De La Societe Chimique De France, 1967, pp: 261-268 and A. Casalot as described in "The Ternary Systems $V_2O_5$—$VO_2$MO", J. Inorg. Nucl. Chem., 1969, Vol. 31, pp: 3049-3058. Galy and Casalot each carried out their work at a temperature of at least about 600° C. Casalot used sealed vycor tubes. Examples of the formation of Co (cobalt) and Ni (nickel) vanadium oxides of $M_{(1+y)}(V_3O_8)_2$ (M=Co or Ni), will now be described.

The different reactions were carried out mostly in the solid state. It is necessary to finely grind the starting products in order to well homogenize the solid state reaction mixture. The products are subjected to several successive thermal treatments separated by grindings.

The last one of these treatments is done at the temperature at which the system is defined. It is always followed by a violent tempering (quenching) of the sample, from the reaction temperature to that of a cold water bath. After the reaction, the evolution of a system as a function of the nature and of the insertion level (rate) x of metal M may be verified by a radiocrystallographic analysis. That technique makes it possible to specify the limits of the desired and most preferred ranges for y in the expression $M_{(1+y)}$.

The chemical analysis of the different samples obtained after thermal treatment agreed well with the theoretical values. It was not accurate enough, however, for the determination of the level of oxygen. Thus, Casalot determined this by weighing the sample before and after reaction, in order to detect any mass variation.

The systems developed by Casalot in which $x \leq 1$, the value $x=1$ corresponded as a whole, for vanadium, to an oxidation degree 4. The results are close to those of Galy for the corresponding systems of magnesium and of zinc. Such systems are illustrated in FIGS. 2, 3, 4 and 5 and Tables 1 and 2. In these figures, are shown the limits of the different fields of existence. They are schematically given by the various values for the composition $M_{(1+y)}(V_3O_8)_2$. This is the phase of interest. Another set of values for $M_xV_2O_5$ are also given, as this composition is related to the $M_{(1+y)}(V_3O_8)_2$ active material of interest.

The upper limit $x_1$ of the field of existence is approximately equal to 0.03 for cobalt and to 0.04 for nickel in $M_xV_2O_5$. These values here again imply that the degree of oxidation of the inserted metal plays only a secondary part, but on the other hand, that the field of homogeneity of the $\alpha$ phases decreases when the ionic radiation increases. The $\alpha$ phase of limit composition coexists with the $V_6O_{13}$ and (with) the new phase of interest ($M_{(1+y)}(V_3O_8)_2$), also referred to as phase A. The upper limit ($x_2=0.42$) corresponding to this triphased field is rigorously the same for systems relating to magnesium, cobalt and nickel. Casalot, by analogy with the work of Galy 10, propose for this phase A the composition $M_{(1+y)}(V_3O_8)_2$, the active material of the invention.

TABLE 1

| | Limit of the Fields of Existence* | | | |
|---|---|---|---|---|
| | System $V_2O_5$—$VO_2$—MgO (630° C.) | System $V_2O_5$—$VO_2$—ZnO (630° C.) | System $V_2O_5$—$VO_2$—CoO (600° C.) | System $V_2O_5$—$VO_2$—NiO (600° C.) |
| $M_{(1+y)}(V_3O_8)_2$ | | | | |
| $y_1$ | — | — | 0.06 | 0.07 |
| $y_2$ | 0.88 | 0.84 | 0.90 | 0.87 |
| $y_3$ | 1.00 | 1.00 | 1.00 | 1.00 |
| $M_xV_2O_5$ | | | | |
| $x_1$ | 0.11 | 0.03 | 0.03 | 0.04 |
| $x_2$ | 0.42 | 0.41 | 0.42 | 0.42 |
| $x_3$ | 0.44 | 0.44 | 0.44 | 0.44 |
| $x_4$ | 0.50 | 0.50 | 0.50 | 0.50 |

TABLE 1-continued

| | Limit of the Fields of Existence* | | | |
|---|---|---|---|---|
| | System $V_2O_5$—$VO_2$—MgO (630° C.) | System $V_2O_5$—$VO_2$—ZnO (630° C.) | System $V_2O_5$—$VO_2$—CoO (600° C.) | System $V_2O_5$—$VO_2$—NiO (600° C.) |
| $x_5$ | 0.66 | 0.66 | 0.75 | 0.75 |

*Values of y in $M_{(1+y)}(V_3O_8)_2$ and x in $M_xV_2O_5$

The reaction scheme used is the following one:
$xM + V_2O_5 \rightarrow M_xV_2O_5$ (M=Co, Ni).

The barycenter rule makes it possible to write:
$xM + V_2O_5 \rightarrow (1-a)M_{x1}V_2O_5 + a/9V_6O_{13} + 2a/9M_{1+y}(V_3O_8)_2$; with $a = (x-x_1)/(x_2-x_1)$.

$-X_2 < X < X_3$. The $V_6O_{13}$ oxide coexists with the phase A of the invention. It is deduced from this that the latter has a small field of existence, the same one in both systems, since the $x_2$ and $x_3$ values are identical ($x_2 = 0.42$ and $x_3 = 0.44$). The formation reaction is written:
$xM + V_2O_5 \rightarrow 1/9V_6O_{13} + 2/9M_{1+y}(V_3O_8)_2$.

The relationship between the two variables x and y is $y = 9/2x - 1$. Starting from the experimental limits $x_2$ and $x_3$, it is possible to calculate the corresponding limits of the phase A. For one element as well as for the other, the phase A is formed for preferably approximately $0.89 < Y < 0.98$.

$-x_3 < X < x_4$. Between $x_3 = 0.44$ and $x_4 = 0.50$, the phase A of limit composition is in equilibrium not only with $V_6O_{13}$, but also with $VO_2$.

Preferred Values of y in $M_{(1+y)}(V_3O_8)_2$ Active Material

In order to check the formulation of the A phase, the fields (areas) of existence of the phases that may be formed on the straight line of composition $M_{1+y}(V_3O_8)_2$ were verified by Casalot. All of the preparations were carried out in a sealed vycor tube at 600° C., that is to say at the temperature at which the two ternary diagrams have been established. The synthesis starting from the three oxides is done according to Casalot's reaction diagram:

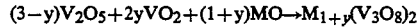
$(3-y)V_2O_5 + 2yVO_2 + (1+y)MO \rightarrow M_{1+y}(V_3O_8)_2$

The results obtained are as follows: $-0 < y < y_1$. In this field of composition, there exists no phase of formula $M_xV_2O_5\alpha$: $[M_{1+y}(V_3O_8)_2] \rightarrow M(VO_3)_2 + 2M_xV_2O_5\alpha$; with $y = 2x$.

This relationship makes it possible to deduce the theoretical limits of the two fields, from those of the fields of existence of the $M_xV_2O_5\alpha$ phases: $y_1$ therefore is equal to 0.06 in the case of cobalt (FIG. 2) and to 0.08 in the case of nickel (FIG. 3); the experimental values in fact are 0.06 and 0.07.

$-y_1 < y < y_2$. The phase $M_xV_2O_5\alpha$ of limit composition is in equilibrium with the metavanadate $M(VO_3)_2$ and with the new phase A identified as the A phase of lower limit composition:

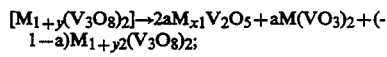
$[M_{1+y}(V_3O_8)_2] \rightarrow 2aM_{x1}V_2O_5 + aM(VO_3)_2 + (1-a)M_{1+y2}(V_3O_8)_2$;

with $a = (y_2-y)/(y_2-y_1)$.

$-y_2 \leq y \leq y_3$. These values of y limit the field of existence of a single phase of formula $M_{1+y}(V_3O_8)_2$ the diffraction spectrum of which is none other than that of the phase A shown during the study of the straight line of composition $M_xV_2O_5$. While the upper limit ($Y_3 = 1$) is the same for the systems relative to cobalt and to nickel, the lower limit $Y_2$ varies from 0.90 in the case of cobalt to 0.87 for the case of nickel. These values are very close to those found for the A phases of the homologous systems of magnesium ($Y_2 = 0.88$; $y_3 = 1$) and of zinc ($y_2 = 0.84$ and $y_3 = 1$).

Figure 2:
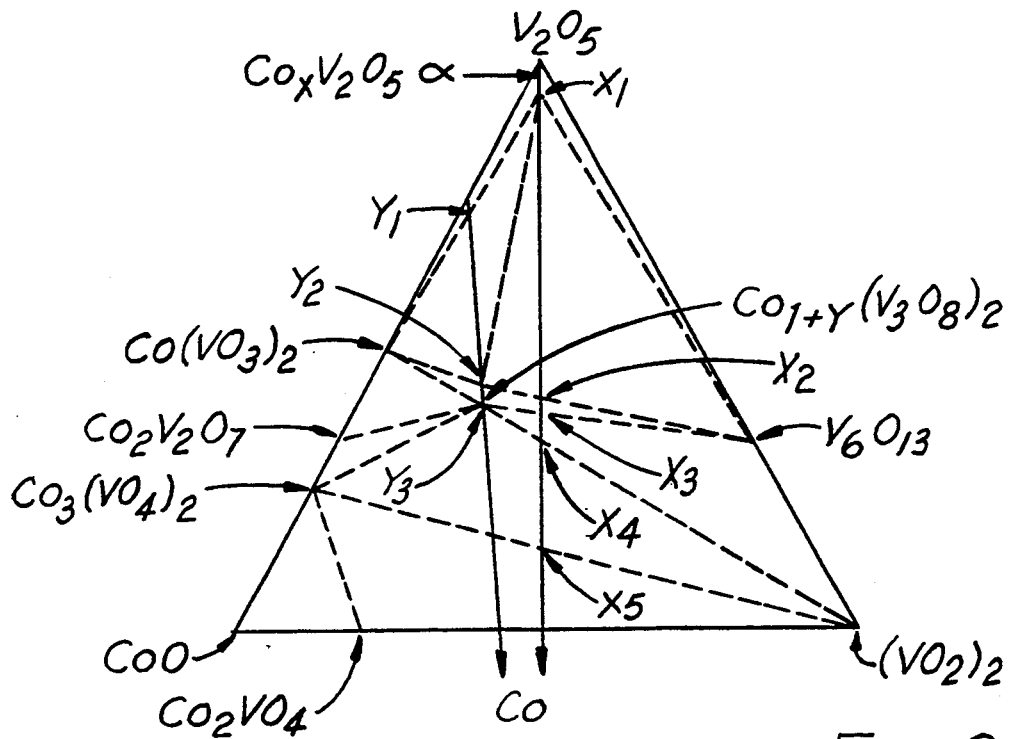
FIGS. 2–5 are phase diagrams containing the $M^{+2}_{(1+y)}(V_3O_8)_2$ active material compositions.
Figure 3:
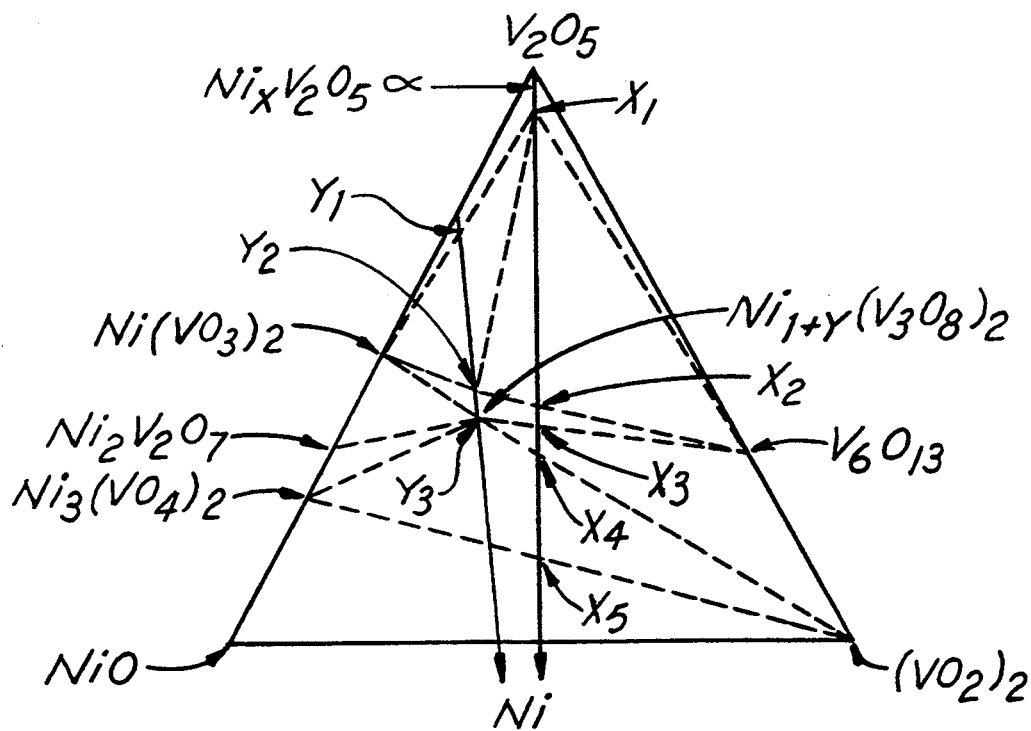
Figure 4:
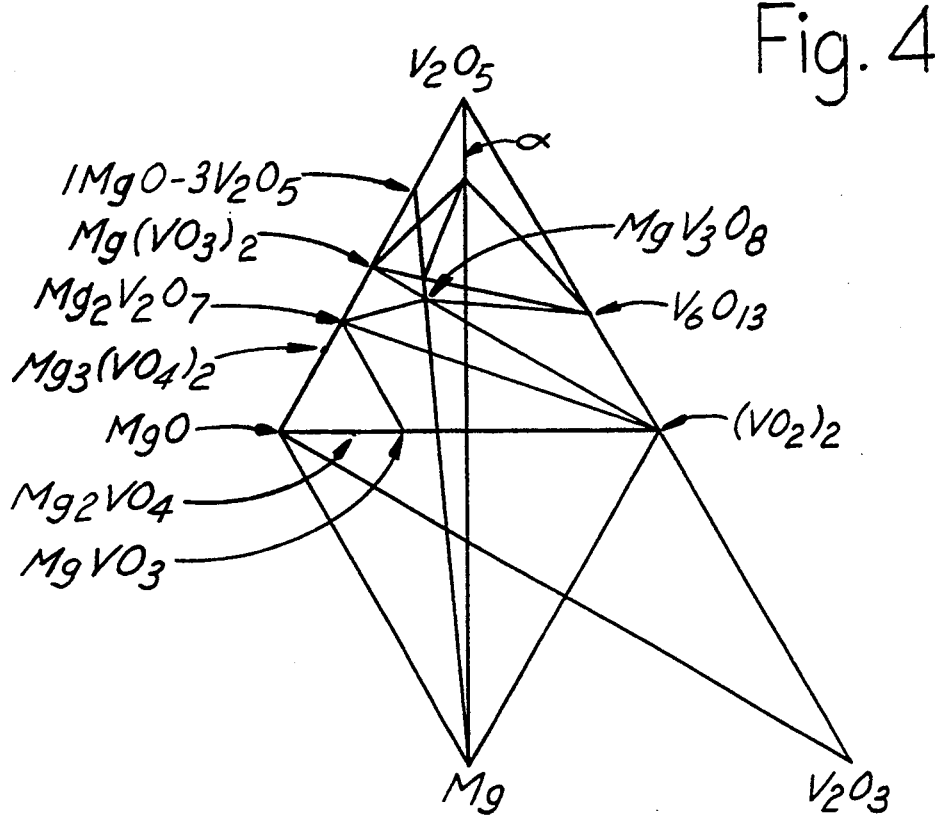
Figure 5:
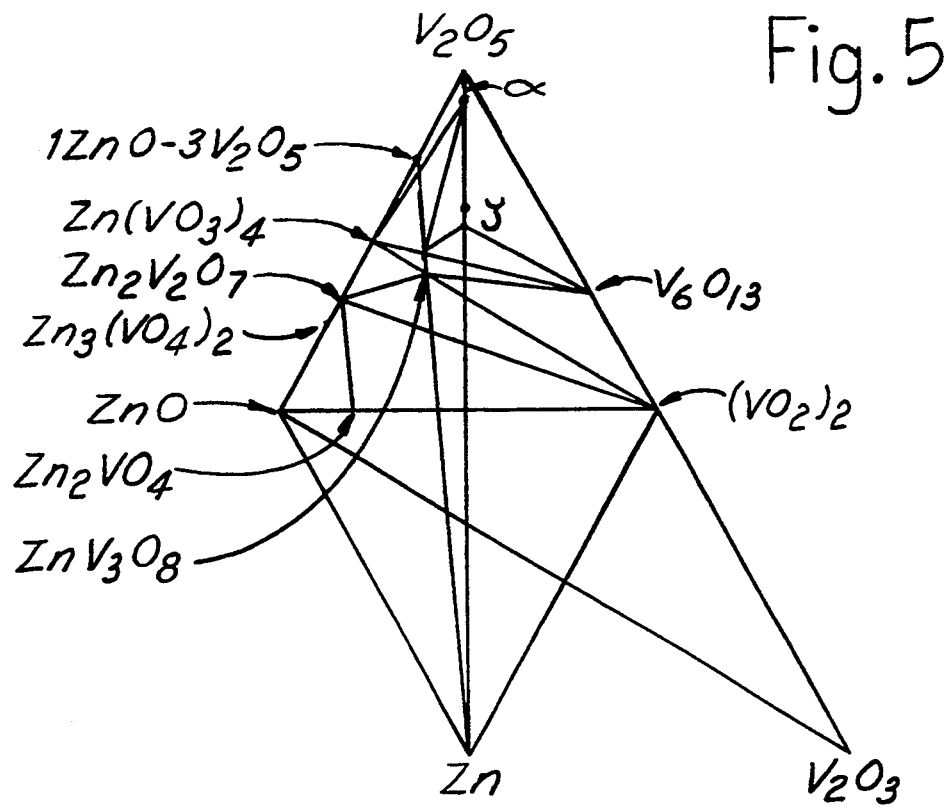

$-y_3 < y$. When y becomes greater than 1, the complexes of $M_{1+y}(V_3O_8)_3$ composition then are located inside the known composition triangles that are shown in FIGS. 2 and 3. In some cases it may be preferred to have a value of y greater than one and no greater than two.

$Co_{1+y}(V_3O_8)_2$ ($0.90 \leq y \leq 1$). As their homologues of magnesium and of zinc, the compounds of formula $Co_{1+y}(V_3O_8)_2$ exist in two allotropic forms. The low temperature variety $\alpha$ is reversibly transformed at 650° ±8° C. into a high temperature $\beta$ variety. The A phase shown in the study of the vanadium anhydride-cobalt system obviously is identified with the $\alpha$ variety. $Co_{1+y}(V_3O_8)_2\beta$ have a congruent point of fusion at 685° ±5° C.

TABLE 2

| | $Mg_{1+y}(V_3O_8)_2\alpha$ y = 1 | $Co_{1+y}(V_3O_8)_2\alpha$ y = 1 | $Ni_{1+y}(V_3O_8)_2\alpha$ y = 1 | $Mg_{1+y}(V_3O_8)_2\beta$ y = 0.90 | $Co_{1+y}(V_3O_8)_2\beta$ y = 1 |
|---|---|---|---|---|---|
| Density Observed | 3.39 | 3.80 | 3.71 | 3.37 | 3.76 |
| Density Calculated | 3.42 | 3.85 | 3.74 | 3.41 | 3.78 |

$Ni_{1+y}(V_3O_8)_2$ ($0.87 \leq y \leq 1$). Their behavior under heat is exceptional for this type of compound, with the exception of a reversible polymorphic transformation circa 800° ±10° C. The fusion temperature of $Ni_{1+y}(V_3O_8)_2$ is located beyond 1350° C. Such an exceptional temperature very clearly distinguishes $Co_{1+y}(V_3O_8)_2$ from $Ni_{1+y}(V_3O_8)_2$.

Bronzes $Mg_{(1+y)}(V_3O_8)_2$ with $0.88 < y < 1$ and $Zn_{(1+y)}(V_3O_8)_2$ with $0.84 \leq y \leq 1$ The A phase of the bronze type signalled during the study of the $Mg$-$V_2O_5$ and $Zn$-$V_2O_5$ by Galy is obtained, in the absence of any other phase, by the action of $VO_2$ on the metavanadate of magnesium or of zinc in a stoichiometric ratio equal to 1. There results from this, therefore, a formula $MgV_3O_8$ or $ZnV_3O_8$:

$M(VO_3)_2 + VO_2 \rightarrow MV_3O_8$ (M:Mg, Zn)

This phase has a field of homogeneity located on the straight line representative of the bronzes of the $M_{(1+y)}(V_3O_8)_2$ type, that is to say, the straight line that joins the point of composition $MO + 3V_2O_5$ to the point corresponding to the metal (Mg, Zn). Phase A is obtained, indeed, by the action in a vycor tube and at 630° C., if the metal, magnesium or zinc, on a mixture the composition of which is $MO+3V_2O_5$ in suitable quantities.

It is, therefore, possible to ascribe to the A phase a formula $Mg_{(1+y)}(V_3O_8)_2$ or $Zn_{1+y}(V_3O_8)_2$, the theoretical lower composition limit of the phases $M_{1+y}(V_3O_8)_2$ of magnesium or of zinc corresponding to the mixture $MO+3V_2O_5$, that is to say, to the formula $M(V_3O_8)_2$. The action of $VO_2$ on $M(VO_3)_2$ brings about, under these conditions, a phase the composition of which is $M_2(V_3O_8)_3$ or $MV_3O_8$. The study of the action of magnesium or of zinc at 630° C. on $MgO+3V_2O_5$ or $ZnO+3V_2O_5$ mixtures, followed by a tempering, makes it possible to limit the fields of homogeneity of the two phases, and to determine the fields of existence of the two phases, $Mg_{(1+y)}(V_3O_8)_2$ and $Zn_{(1+y)}(V_3O_8)_2$. See FIGS. 4 and 5.

That of $Mg_{1+y}(V_3O_8)_2$ corresponds to $0.88<y<1$, that of $Zn_{1+y}(V_3O_8)_2$ corresponds to $0.84<y<1$. When y is inferior respectively to 0.88 and 0.84, the lower limit phase coexists with $M_xV_2O_5\alpha$ and (with) the metavanadate; for $y>1$, the upper limit phase is in equilibrium with $VO_2$ and (with) the pyrovanadate.

Figure 6:
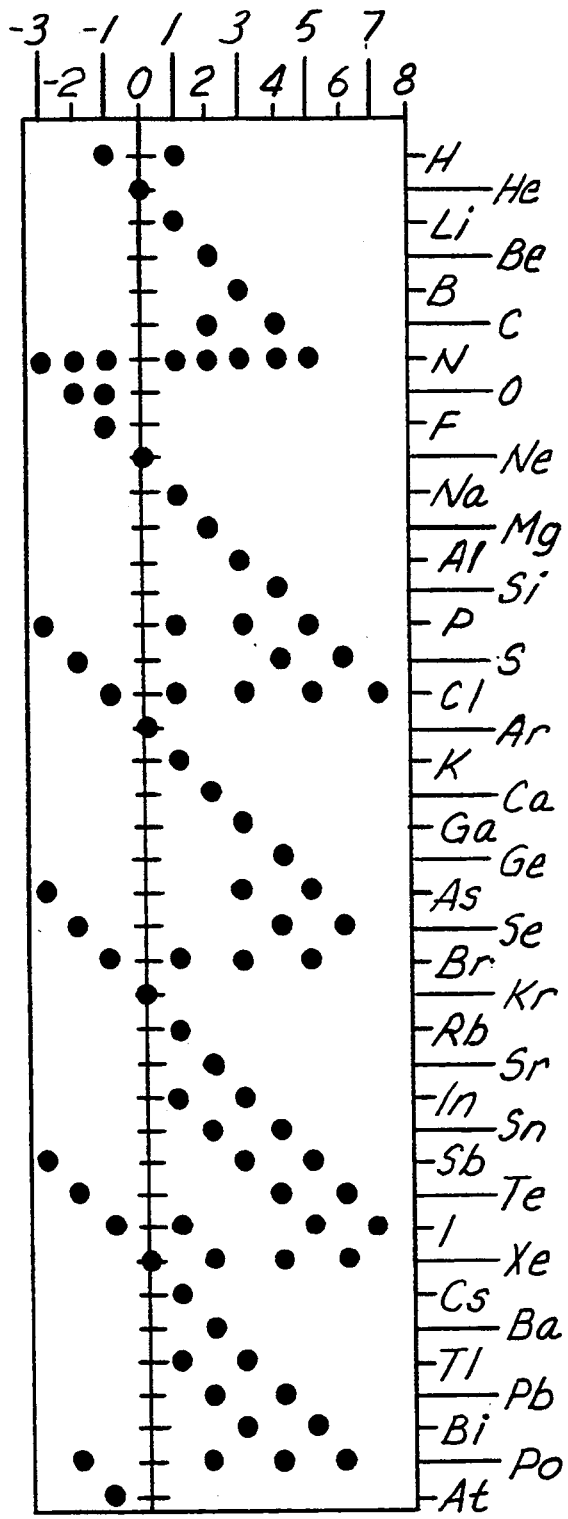
FIG. 6 contains charts (a,b) showing common oxidation states of representative elements (a) and transition elements (b).
Figure 6:
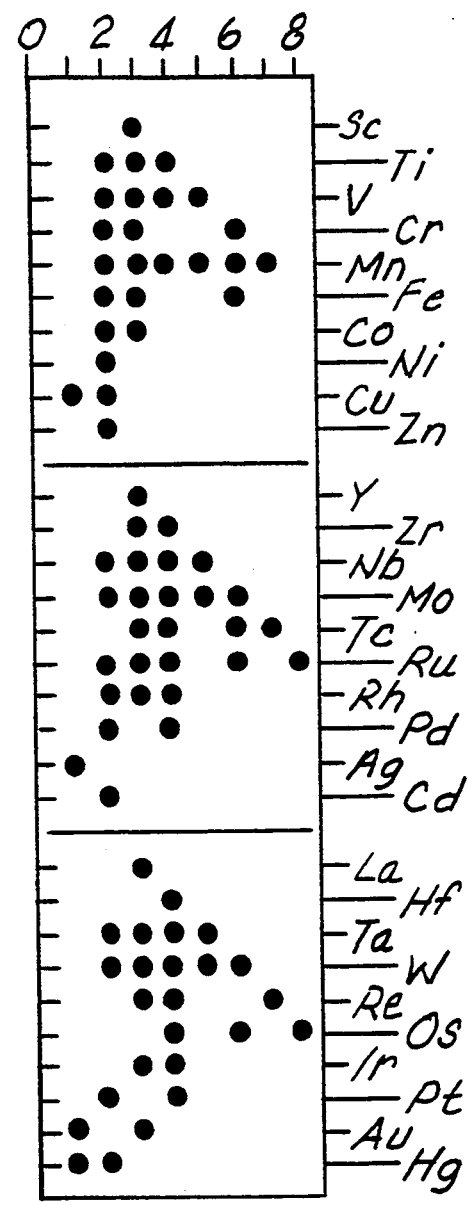

It is preferred that the M ion of the active material product be a divalent ion such as $Mg^{2+}$, $Ni^{2+}$, $Co^{2+}$ and $Zn^{2+}$. Although the divalent ion is preferred, it should be understood that many elements have more than one oxidation state. For example, cobalt may exist as 0, +2 and +3. It is only required that the metallic element used in the complex oxide of the invention be capable of a +2 valance state. The metallic element may also be capable of valance states in addition to +2. Refer to FIG. 6 for oxidation (valency) states. Such M ions selected are from the group of metal and semi-metal elements which constitute about three-quarters of the Periodic Table. Such metal and semi-metal elements are also commonly referred to as metallic elements. Metallic elements are distinguished from non-metallic elements by their luster, malleability, conductivity and usual ability to form a positive ion. Semi-metals are also considered in the group as having metallic characteristics, as distinguished from non-metals. Metals and semi-metals are capable of forming positive ions and are conductors of electricity. Conductivity of semi-metals is small, on the order of 10 to $10^{-5}$ ohm$^{-1}$ cm$^{-1}$. Metals have higher conductivities generally greater than $10^4$ ohm$^{-1}$ cm$^{-1}$. Such metals and semi-metals appear in the left hand part of the Periodic Table and are separated from the non-metals by a diagonal band of semi-metals that run from boron to tellurium. The classification of elements close to this group of semi-metals is not always understood. However, metallic behavior is found among the transition elements, the members of groups I and II, and the heavier elements of groups IIIB, IVB and VB. Transition elements occur between groups IIA and IIIB in the long form of the Periodic Table.

Preparation of Electrodes Using the Vanadium Oxide Active Material

The vanadium oxide compounds of the invention $M_{(1+y)}(V_3O_8)_2$ may be used to prepare electrodes by mixing the $M_{(1+y)}(V_3O_8)_2$, carbon (typical Shawinigan Black) and an electrolyte/binder.

Carbon particles for use in electrodes may be obtained from a variety of sources such as Union Carbide, Noury Chemical Corporation, and other major chemical companies. In an as-received condition, such carbon particles have a BET surface area on the order of hundreds-of-square meters per gram. The particles have an average or median particle size or equivalent average diameter in the range of about 10 to about 100 nanometers (0.01 to 0.1 microns), and typically in the order of 30 nanometers. Thus, the carbon particles are very fine and of submicron size. Carbon particles for use in electrodes may be obtained from a variety of sources such as Union Carbide, Noury Chemical Corporation, and other major chemical companies. In an as-received condition, such carbon particles have a BET surface area on the order of hundreds of square meters per gram. The particles have an average or median particle size or equivalent average diameter in the range of about 10 to about 100 nanometers (0.01 to 0.1 microns), and typically in the order of 30 nanometers. Thus, the carbon particles are very fine and of submicron size. A typical cathode composition is as given in Table 3.

TABLE 3

| Typical Cathode Composition | Percent by Weight |
| --- | --- |
| $M_{(1+y)}(V_3O_8)_2$ | 45.2% |
| Carbon | 10.3% |
| Propylene Carbonate (PC) | 33.3% |
| PolyEthylene Oxide (PEO) | 1.0% |
| PolyEthyleneGlycolDiAcrylate (PEGDA) | 8.8% |
| TriMethylPolyEthylene Oxide TriAcrylate (TMPEOTA) | 1.5% |

The cathode is coated onto nickel foil followed by electron beam curing (cross-linking/polymerization) of the acrylate component. Then the electrolyte is coated on top of the cathode and cured with ultraviolet light. The lithium electrode is applied on top of the electrolyte separator and the battery is finally placed in a flexible pouch which is heat sealed under vacuum.

The cathode properties are expected to be similar to, or better than those of $LiV_3O_8$ because of the higher charge density on the $M^{2+}$ ion. The higher charge density will ensure a more rugged structure which is less likely to degrade during the lithium insertion and extraction reaction.

Because of the heavier divalent ion, the specific capacities are smaller than that of $LiV_3O_8$ at 280 Ah/kg. It is assumed that the number of lithium ions which can be inserted is 3 in each of the structures. This number may be smaller, especially for the Mg and Zn compounds as they usually do not exist in oxidation states other than 0 and +2. The transition metal compounds, on the other hand, are unpredictable because both Ni and Co may participate in the reaction and thereby increase the capacity. Even if the capacity is lower than that of $LiV_3O_8$, the use of the active material vanadium oxide compounds of the invention have better capacity retention during cycling and this provides a better accumulated capacity.

While this invention has been described in terms of certain embodiments thereof, it is not intended that it be limited to the above description, but rather only to the extent set forth in the following claims.

The embodiments of the invention in which an exclusive property or privilege is claimed are defined in the appended claims.

I claim:

1. A positive electrode comprising a current collector and an electrode material in contact with the current collector, said electrode material comprising a vanadium oxide compound represented by the nominal general formula $M_{(1+y)}(V_3O_8)_2$ where y has a value equal to or greater than zero and M is a metal or semi-metal element having a divalent (+2) valency.

2. The positive electrode according to claim 1, wherein y has a value $0 \leq y \leq 2$.

3. The positive electrode according to claim 1, wherein y has a value $0.5 \leq y \leq 1$.

4. The positive electrode according to claim 1, wherein M is an alkaline earth metal or a transition metal.

5. The positive electrode according to claim 1, wherein M is selected from the group consisting of magnesium, zinc, cobalt and nickel.

6. The positive electrode according to claim 1 wherein y is less than or equal to one.

7. The positive electrode according to claim 1 wherein y is less than one.

8. A battery having a lithium containing negative electrode, a positive electrode and an electrolyte therebetween, said positive electrode having an active material consisting essentially of a vanadium oxide compound represented by the nominal general formula $M_{(1+y)}(V_3O_8)_2$ where y has a value equal to or greater than zero and M is a metal or semi-metal having a valency of +2.

9. The battery according to claim 8, wherein M is selected from the group consisting of alkaline earth matals and transition metals.

10. The battery according to claim 8, wherein M is selected from the group consisting of magnesium, zinc, cobalt and nickel.

11. The battery according to claim 8, wherein the negative electrode has an active material consisting essentially of lithium and the electrolyte comprises a non-aqueous electrolytic solution containing a salt of lithium.

12. The battery according to claim 8 wherein y is less than or equal to one.

13. The battery according to claim 8 wherein y is less than one.

14. A positive electrode composite comprising an electrically conductive material selected from the group consisting of carbon and conductive polymers having conjugated network of double bonds intermingled with an active material, said active material comprising a vanadium oxide compound represented by the nominal general formula $M_{(1+y)}(V_3O_8)_2$ where y has a value equal to or greater than zero and M has a divalent (+2) valency.

15. The positive electrode according to claim 14, wherein y has a value of $0 \leq y \leq 2$.

16. The positive electrode according to claim 14, wherein y has a value of $0.5 \leq y \leq 1$.

17. The positive electrode according to claim 14, wherein M is selected from the group consisting of magnesium, zinc, cobalt and nickel.

18. The positive electrode according to claim 14 wherein the electrically conductive material consists essentially of particles of carbon.

19. The positive electrode according to claim 18 wherein the active material is in particle form and the active material particles are intermingled with the carbon particles.

20. The positive electrode according to claim 14 and further including an electrolyte/binder material intermingled with the electrically conductive material and the active material.

21. The positive electrode according to claim 14 wherein y is less than or equal to one.

22. The positive electrode according to claim 14 wherein y is less than one.

* * * * *